United States Patent
Kubota et al.

(10) Patent No.: US 11,765,203 B2
(45) Date of Patent: Sep. 19, 2023

(54) COMMUNICATION DEVICE AND COMMUNICATION METHOD FOR PLANT CONTROL SYSTEM

(71) Applicant: Hitachi, Ltd., Tokyo (JP)

(72) Inventors: Manabu Kubota, Tokyo (JP);
Tatsuyuki Ootani, Tokyo (JP);
Katsumi Yoshida, Tokyo (JP)

(73) Assignee: HITACHI, LTD., Tokyo (JP)

( * ) Notice: Subject to any disclaimer, the term of this patent is extended or adjusted under 35 U.S.C. 154(b) by 8 days.

(21) Appl. No.: 17/539,288

(22) Filed: Dec. 1, 2021

(65) Prior Publication Data

US 2022/0182411 A1  Jun. 9, 2022

(30) Foreign Application Priority Data

Dec. 3, 2020  (JP) .................... 2020-200759

(51) Int. Cl.
*H04L 9/40*  (2022.01)
*H04W 12/71*  (2021.01)
(Continued)

(52) U.S. Cl.
CPC ....... *H04L 63/1483* (2013.01); *H04W 12/122* (2021.01); *H04W 12/65* (2021.01); *H04W 12/71* (2021.01)

(58) Field of Classification Search
CPC ............. H04L 63/1483; H04L 41/0866; H04L 43/0811; H04L 41/0672; H04L 43/10; H04W 12/122; H04W 12/65; H04W 12/71
See application file for complete search history.

(56) References Cited

U.S. PATENT DOCUMENTS

| 5,724,510 A | * | 3/1998 | Arndt | ...................... H04L 61/10 709/224 |
| 2007/0061018 A1 | * | 3/2007 | Callaghan | .............. G05B 19/05 700/1 |

(Continued)

FOREIGN PATENT DOCUMENTS

JP  2003-218869 A  7/2003

OTHER PUBLICATIONS

Chen et al., "Physical Layer Authentication Schemes Against Clone Node and Sybil Attacks in Wireless Industrial Internet", Nov. 2019, IEEE International Conference on Industrial Internet, pp. 381-386 (Year: 2019).*

*Primary Examiner* — Kenneth W Chang
(74) *Attorney, Agent, or Firm* — MATTINGLY & MALUR, PC (57) ABSTRACT

A plant control system and communication method are capable of immediately dealing with wrong address settings created due to a human error during the execution of an opening procedure. In the plant control system, a higher-level device and a plurality of communication terminal devices are connected to each other through a communication path. Prior to the start of communication, a communication opening process of sequentially transmitting a call signal from the higher-level device to the terminal devices and acknowledging response signals therefrom is executed, which is followed by sequentially transmitting a call signal from the higher-level device to the terminal devices and receiving response signals from the terminal devices. The communication terminal devices compare addresses of the response signals returned from the other terminal devices to the higher-level device against an address set for local terminal devices. If a duplicate address exists, communication from the local terminal device is locked.

5 Claims, 6 Drawing Sheets

(51) Int. Cl.
*H04W 12/65* (2021.01)
*H04W 12/122* (2021.01)

(56) References Cited

U.S. PATENT DOCUMENTS

| | | | |
|---|---|---|---|
| 2009/0086692 A1* | 4/2009 | Chen | H04L 67/12 |
| | | | 370/338 |
| 2009/0222885 A1* | 9/2009 | Batke | H04L 63/0823 |
| | | | 713/168 |
| 2011/0047218 A1* | 2/2011 | Nojima | G05B 19/41855 |
| | | | 709/205 |
| 2013/0166737 A1* | 6/2013 | Christenson | H04L 61/5046 |
| | | | 709/224 |
| 2016/0308825 A1* | 10/2016 | Jain | H04L 61/103 |
| 2017/0093912 A1* | 3/2017 | Poomalai | H04L 63/162 |
| 2017/0228330 A1* | 8/2017 | Huang | G06F 13/4081 |

* cited by examiner

FIG. 3

COMMUNICATION DEVICE AND COMMUNICATION METHOD FOR PLANT CONTROL SYSTEM

CLAIM OF PRIORITY

The present application claims priority from Japanese Patent application serial No. 2020-200759, filed on Dec. 3, 2020, the content of which is hereby incorporated by reference into this application.

BACKGROUND OF THE INVENTION

1. Field of the Invention

The present invention relates to a communication device and method that are designed for a plant control system configured to establish communication and are used to prevent the plant control system from malfunctioning due to address duplication.

2. Description of the Related Art

A known method described, for example, JP-2003-218869-A is designed for a plant control system configured to establish communication, and used to define a communication device initialization procedure for allowing a communication device to open communication and prevent the communication device from malfunctioning due to an illegal address.

SUMMARY OF THE INVENTION

For the plant control system, which is required to exhibit high availability, control continuity is regarded as important. In a case where, for example, equipment failure occurs, it is necessary for the plant control system to achieve immediate recovery. Therefore, a procedure for opening control communication needs to be simplified wherever possible. However, an opening check procedure is required to be performed in order to safely open control communication without causing a malfunction, and performing the opening check procedure requires a significant amount of processing time. This is the opposite of immediacy.

Human error committed during hotline maintenance and replacement is one of the causes of malfunctioning. One of such human error causing a device malfunction is a duplicated address setting. However, in a case where duplicate addresses are inadvertently set for two out of a plurality of communication devices connected at multiple points, response communication frames outputted from the individual communication devices conflict with a request communication frame of a higher-level device. This interferes with communication to a healthy control device, which intrinsically requires no curing, and thus causes a malfunction.

The above problem has been conventionally solved by defining an opening procedure to be performed by the higher-level device with respect to the individual communication devices and inhibiting the communication devices from starting communication before the opening procedure is properly completed. When this solution is applied, the opening procedure will not be completed in a case where an address error is encountered. This makes it possible to prevent a healthy control device from malfunctioning and from being affected by communication interference.

However, when only the above solution is applied, the opening procedure is completed in a pseudo-normal manner in a case where operating personnel of the higher-level device further commits a human error by performing the opening procedure with respect to wrong addresses of the communication device. As a result, a further problem arises where malfunctioning cannot be avoided.

In view of the above circumstances, the present invention has been made to provide a plant control system and a communication method therefor that are capable of immediately dealing even with a wrong address setting that is formed due to a human error during the execution of an opening procedure.

Under the above circumstances, according to an aspect of the present invention, there is provided a plant control system configured such that a higher-level device and a plurality of communication terminal devices are connected through a communication path. The plant control system executes, prior to the start of communication, a communication opening process of sequentially transmitting a call signal from the higher-level device to the communication terminal devices and acknowledging response signals from the communication terminal devices, and proceeds to execute a normal communication process of sequentially transmitting a call signal from the higher-level device to the communication terminal devices and receiving response signals from the communication terminal devices. Meanwhile, the communication terminal devices compare the addresses of response signals returned from the other communication terminal devices to the higher-level device against an address set for the local communication terminal device. If the comparison indicates that a duplicate address exists, the communication terminal devices lock the communication from the local communication terminal device.

According to another aspect of the present invention, there is provided a communication method for a plant control system configured such that a higher-level device and a plurality of communication terminal devices are connected through a communication path. The communication method includes the steps of: causing the plant control system to execute, prior to the start of communication, a communication opening process of sequentially transmitting a call signal from the higher-level device to the communication terminal devices and acknowledging response signals from the communication terminal devices, and proceed to execute a normal communication process of sequentially transmitting a call signal from the higher-level device to the communication terminal devices and receiving response signals from the communication terminal devices; and causing the communication terminal devices to compare the addresses of response signals returned from the other communication terminal devices to the higher-level device against an address set for the local communication terminal device, and if the comparison indicates that a duplicate address exists, causing the communication terminal devices to lock the communication from the local communication terminal device.

Even when a wrong address is set by both operating personnel of the higher-level device and operating personnel of a communication device, the present invention is able to prevent the opening procedure from being completed. Therefore, the present invention makes it possible to prevent a healthy control device from malfunctioning and from being affected by communication interference.

DESCRIPTION OF THE PREFERRED EMBODIMENTS

Embodiments of the present invention will now be described with reference to the accompanying drawings.

First Embodiment

Figure 1:
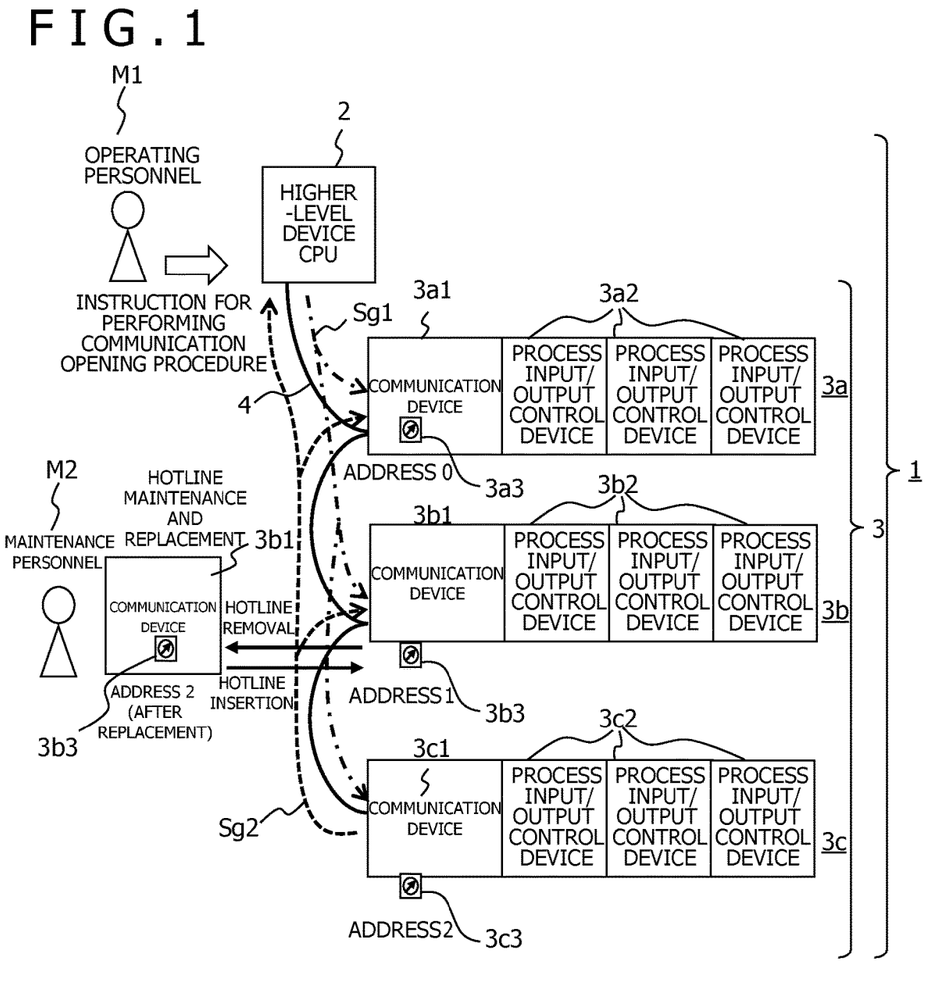
FIG. 1 is a diagram illustrating an example configuration of a plant control system.

FIG. 1 illustrates an example configuration of a plant control system. The plant control system 1 depicted in FIG. 1 includes a higher-level device 2 and a plurality of communication terminal devices 3 (3a, 3b, and 3c). The higher-level device 2 and the communication terminal devices 3 (3a, 3b, and 3c) are connected through a communication path 4. Further, the communication terminal devices 3 (3a, 3b, and 3c) include communication devices 3a1, 3b1, and 3c1, and each include a plurality of process input/output devices 3a2, 3b2, and 3c2. The communication devices 3a1, 3b1, and 3c1 are connected to the communication path 4 in order to communicate with the higher-level device 2.

As the above-described configuration is adopted, in response to an operation instruction from operating personnel M1, a call signal Sg1 from the higher-level device 2 is transmitted to the process input/output devices 3a2, 3b2, and 3c2 through the communication path 4 and the communication devices 3a1, 3b1, and 3c1 of the communication terminal devices 3 (3a, 3b, and 3c), and used to control a plant as needed. Further, various data of the plant are detected by each of the process input/output devices 3a2, 3b2, and 3c2, and transmitted by the reverse route to the higher-level device 2 as a response signal Sg2. It should be noted that the communication path 4 may be wired, wireless, or in any form as far as they provide communication between the higher-level device 2 and the communication terminal devices 3 (3a, 3b, and 3c).

The communication devices 3a1, 3b1, and 3c1 respectively include address setting switches 3a3, 3b3, and 3c3 in order to recognize and distinguish between the communication terminal devices 3 (3a, 3b, and 3c). For example, rotary switches are used as the address setting switches 3a3, 3b3, and 3c3. The addresses of the communication devices 3a1, 3b1, and 3c1 are respectively set, for example, to "0," "1," and "2."

Problems with a conventional communication process will be clarified with reference to FIG. 2 before the description of a communication process provided by the present invention that is applied to the plant control system depicted in FIG. 1, and then the possibility of the problems being solved by the present invention will be explained with reference to FIG. 3 and subsequent figures.

Figure 2:
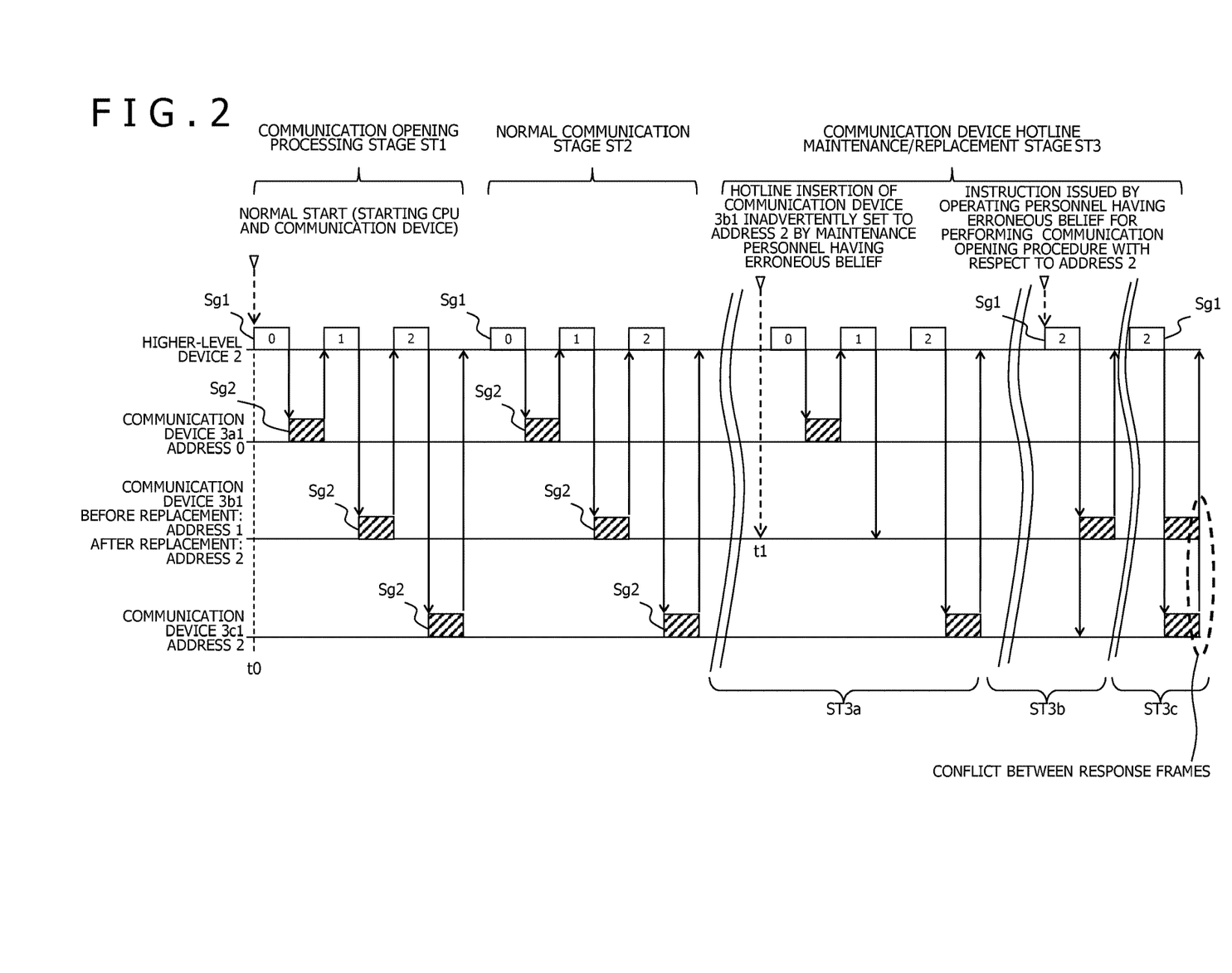
FIG. 2 is a schematic diagram illustrating a conventional communication state in the plant control system depicted in FIG. 1.

FIG. 2 is a schematic diagram illustrating a conventional communication state in the plant control system depicted in FIG. 1. Referring to FIG. 2, the problems to be addressed by the present invention will now be clarified in detail. As the states of communication, FIG. 2 horizontally depicts a communication opening processing stage ST1 immediately subsequent to plant control system startup, a normal communication state ST2 existing after opening, and a communication device hotline maintenance/replacement state ST3. Further, FIG. 2 vertically depicts, from top to bottom, the communication state of the higher-level device 2 and the communication states of the communication devices 3a1, 3b1, and 3c1.

Referring to FIG. 2, in the communication opening processing stage ST1, operating personnel M1 assigned to the higher-level device 2 and maintenance personnel M2 assigned to the communication devices 3a1, 3b1, and 3c1 perform appropriate work. In a preparatory state at time t0 or earlier, which is before the start of the communication opening processing stage ST1, the higher-level device 2 is connected at multiple points to the communication devices 3a1, 3b1, and 3c1 through the communication path 4. Further, according to configuration information possessed by the higher-level device 2, the maintenance personnel M2 properly sets the addresses of the communication devices 3a1, 3b1, and 3c1 to "0," "1," and "2," respectively, in advance by using the address setting switches 3a3, 3b3, and 3c3 on the communication devices 3a1, 3b1, and 3c1.

At startup from the above-described state, the higher-level device 2 performs a processing procedure specified for the communication opening processing stage ST1 with respect to all the communication devices 3a1, 3b1, and 3c1, according to the configuration information. This is accomplished by sequentially calling the communication devices 3a1, 3b1, and 3c1 from the higher-level device 2 through the communication path 4 and acknowledging their responses. For example, the above is accomplished by verifying that the communication device 3a1 having the address "0" has returned a response signal Sg2 to respond to a call signal Sg1 transmitted from the higher-level device 2 to specify the address "0," and that the communication device 3b1 having the address "1" has returned the response signal Sg2 to respond to the call signal Sg1 subsequently transmitted from the higher-level device 2 to specify the address "1," and further that the communication device 3c1 having the address "2" has returned the response signal Sg2 to respond to the call signal Sg1 subsequently transmitted from the higher-level device 2 to specify the address "2." It should be noted that the communication devices 3a1, 3b1, and 3c1 each include a communication opening register, and that control communication registers other than the communication opening register are inaccessible before the opening of communication.

When the completion of a communication opening procedure is verified by acknowledging proper responses made by the response signal Sg2, control communication starts at the next stage based on the normal communication state ST2 existing after opening. The higher-level device 2 sequentially issues the call signal Sg1 including a request communication frame to the communication devices 3a1, 3b1, and 3c1. Subsequently, when the communication devices 3a1, 3b1, and 3c1 return the response signal Sg2 in response to the issued call signal Sg1, control communication is conducted between the higher-level device 2 and the communication devices 3a1, 3b1, and 3c1.

It should be noted that, in the communication depicted in FIG. 2, the call signal Sg1 issued by the higher-level device 2 has reached all the communication terminal devices 3 (3a, 3b, and 3c), or that the response signal Sg2 issued by one of the communication terminal devices 3 (3a, 3b, and 3c) has reached the other communication terminal devices 3. However, the communication terminal devices 3 (3a, 3b, and 3c) do not respond to the received signal if it is not addressed to themselves. Therefore, in FIG. 2, arrow lines are drawn only for the relevant connections between the higher-level device 2 and the communication terminal devices 3. The communication terminal devices 3 (3a, 3b, and 3c) provided by the present invention differ from conventional ones in that the communication terminal devices are actively monitored even if the received signal is not addressed to themselves. This point will be described in detail later with reference to FIG. 3 and subsequent figures.

The communication device hotline maintenance/replacement state ST3 is depicted in three segments, namely, a hotline insertion state ST3a, which is a preliminary stage, an opening processing stage ST3b, which is an intermediate stage, and a normal communication stage ST3c, which is a later stage. The state existing at time t1 during the hotline insertion state ST3a, which is the preliminary stage of the communication device hotline maintenance/replacement state ST3, is a state where, for example, a defective communication device 3b1 is removed from the communication path 4 by the maintenance personnel M2 as depicted in FIG. 1 while the normal communication state ST2 exists, and then a replacement for the defective communication device 3b1 is reconnected to the communication path 4 as a new communication device 3b1. That is to say, the above is a state where so-called hotline insertion/removal has been performed. It is assumed that, in the above instance, the new communication device 3b1, which is employed as the replacement, is inadvertently set to the address "2" and hotline-inserted by the maintenance personnel M2 having an erroneous belief although the new communication device 3b1 should be set to the address "1."

In the hotline insertion state ST3a, which is the preliminary stage, an opening process is still not executed. Therefore, the reconnected communication device 3b1 is merely mechanically connected, and is not recognized as a communication partner. Consequently, communication is properly conducted with communication equipment (the higher-level device 2 and the communication devices 3a1 and 3c1) other than the communication device 3b1.

The maintenance personnel M2 does not notice an address setting error, and then notifies the operating personnel M1 of the completion of repair work and the completion of reconnection of the communication device 3b1. However, if the operating personnel M1 does not notice the address setting error in this instance, the operating personnel M1 having an erroneous belief inadvertently issues an instruction for performing an opening procedure to the address "2." The reason why the operating personnel M1 also erroneously adheres to the address "2" may conceivably be that the operating personnel M1 has believed a notification from the maintenance personnel M2 who has erroneously stuck to the address "2," or that both the maintenance personnel M2 and the operating personnel M1 have initially believed that the address is "2." A reaction exhibited in the above instance is depicted in the opening processing stage ST3b, which is the intermediate stage. Although the address should originally be set to "1," the operating personnel having an erroneous belief allows the higher-level device 2 to transmit the call signal Sg1 specifying the address "2," and the communication device 3b1 having the address "2" makes a response by returning the response signal Sg2. As a result, the opening process is considered to be completed. Although the communication device 3c1, which actually has the address "2," receives the call signal Sg1 specifying the address "2" from the higher-level device 2, the communication device 3c1, which is already engaged in communication, does not react to the call signal Sg1, which is transmitted from the higher-level device 2 to specify the "start of communication" of a communication device having the address "2."

Consequently, the communication path 4 is not only connected to the proper communication device 3c1 having the address "2," but also connected to the wrong communication device 3b1 due to an erroneous setting. As a result, in the normal communication stage ST3c, which is the later stage in the hotline maintenance/replacement state ST3, the communication devices 3c1 and 3b1 both transmit the response signal Sg2 in order to respond to the call signal Sg1, which is transmitted from the higher-level device 2 to specify the address "2." Therefore, a conflict occurs between two response frames on the communication path 4.

When the conflict occurs between the two response frames, the higher-level device 2 detects a communication abnormality. However, control is already disrupted, and an abnormality countermeasure is to be taken subsequently. However, it is desirable that such an abnormality be detected and coped with before the normal communication stage ST3c.

Figure 3:
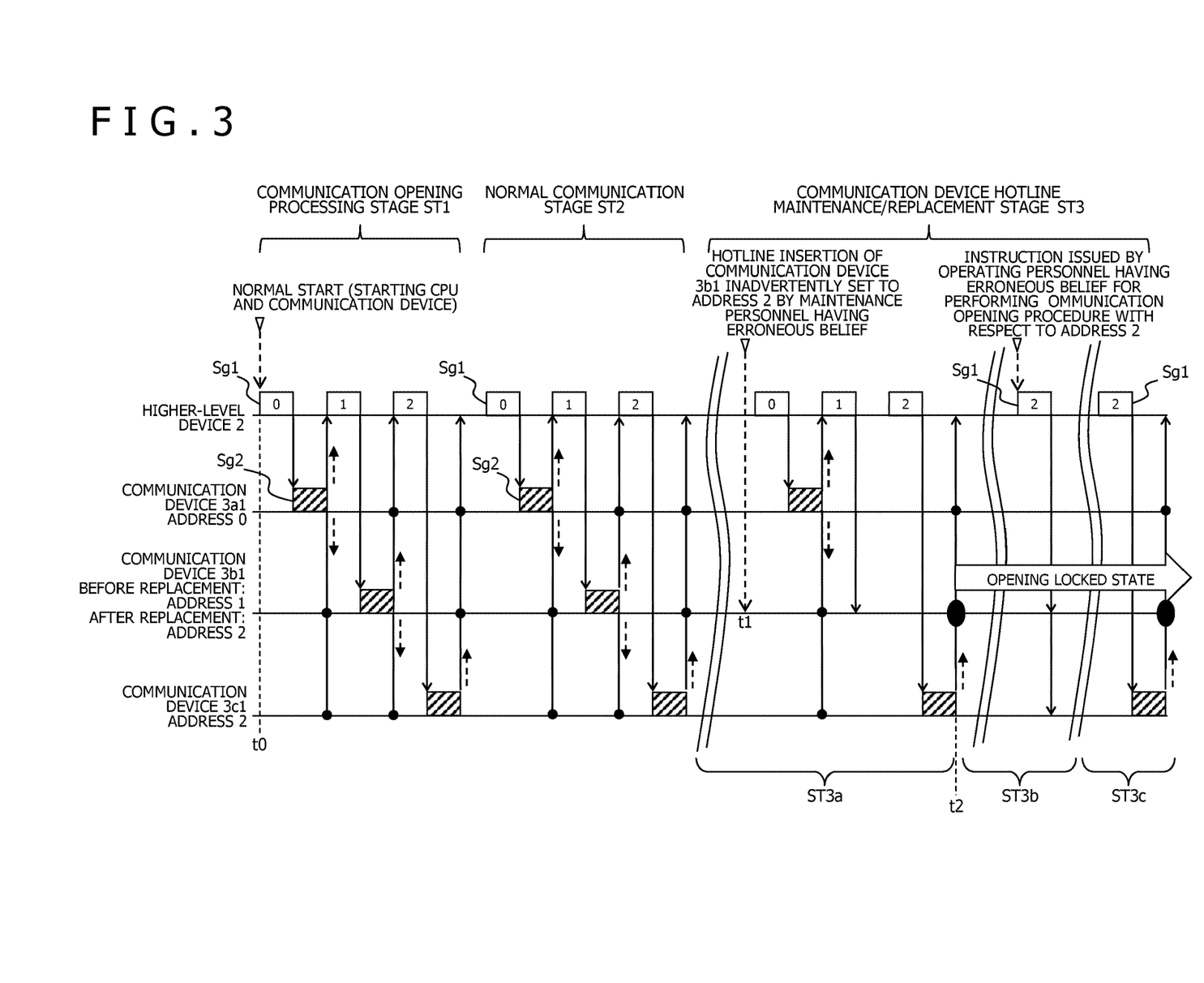
FIG. 3 is a schematic diagram illustrating the communication states in the plant control system depicted in FIG. 1 according to an embodiment of the present invention.

FIG. 3 is a schematic diagram illustrating the communication states in the plant control system depicted in FIG. 1 according to a method based on the present invention. The vertical and horizontal axes of FIG. 3 depict the same devices and states as in FIG. 2. FIG. 3 differs from the FIG. 2 in that FIG. 3 uses black circular marks (●).

As mentioned earlier, the call signal Sg1 issued by the higher-level device 2 during the communication depicted in FIG. 2 has reached all the communication terminal devices 3 (3a, 3b, and 3c), or the response signal Sg2 issued by one of the communication terminal devices 3 (3a, 3b, and 3c) has reached the other communication terminal devices 3. However, upon receiving such a signal, the communication terminal devices 3 (3a, 3b, and 3c) do not make any response if the received signal is not addressed to themselves. Therefore, in FIG. 2, the arrow lines are drawn only for the relevant connections between the higher-level device 2 and the communication terminal devices 3.

Meanwhile, the communication provided by the present invention as depicted in FIG. 3 differs from conventional communication in that the communication terminal devices 3 (3a, 3b, and 3c) actively monitor the response signal Sg2 issued by the other communication terminal devices 3 (3a, 3b, and 3c). This active monitoring scheme is indicated by the black circular marks (●) and the arrow lines.

Referring to FIG. 3, the black circular marks (●) are positioned to indicate that the response signal Sg2 issued by the communication terminal devices 3 (3a, 3b, and 3c) other than the local communication terminal device is monitored in reaction to the call signal Sg1 issued by the higher-level device 2. The communication terminal devices 3 (3a, 3b, and 3c) are related to each other such that the communication terminal devices 3b and 3c monitor the response signal Sg2 issued by the communication terminal device 3a, and that the communication terminal devices 3a and 3c monitor the response signal Sg2 issued by the communication terminal device 3b, and further that the communication terminal devices 3a and 3b monitor the response signal Sg2 issued by the communication terminal device 3c.

Further, response signal monitoring is conducted by confirming the address of a communication frame of the response signal Sg2 issued by the other communication terminal devices 3 and checking whether the confirmed address is a duplicate of the address set for the local communication terminal device. The small black circular marks (●) in FIG. 3 represent a situation where the result of a duplication check indicates that the local address is not duplicated.

According to a time lapse state depicted in FIG. 2, a duplication is detected in the hotline insertion state ST3a, which is the preliminary stage of the communication device hotline maintenance/replacement state ST3, as a result of checking whether the local address is duplicated. In FIG. 3, the time point of the detection of duplication is indicated by a large black circular mark (●).

The following describes how a duplication is detected. It should be noted that processing performed at the communication opening processing stage ST1 and in the normal communication state ST2 existing after opening is the same as conventional processing except that duplication monitoring is conducted. Further, hotline insertion/removal is performed on the communication device 3b1, as is the case with the conventional processing. In a state where the normal communication state ST2 exists at time t1, it is assumed that the maintenance personnel M2 disconnects the communication device 3b1 from the communication path 4 for purposes, for example, inspection or repair, and reconnects the communication device 3b1 to the communication path 4 after completion of inspection or other maintenance work in a so-called hotline insertion/removal state. In this instance, it is assumed that the maintenance personnel M2 having an erroneous belief has inadvertently set the address to "2" although the address should be set to "1," and subsequently has performed hotline insertion on the communication device 3b1.

In the hotline insertion state ST3a, which is the preliminary stage, the opening process is still not executed. Therefore, the reconnected communication device 3b1 is merely mechanically connected and is not recognized as a communication partner. Further, at this time point, the communication device 3b1 does not react to the call signal Sg1 issued by the higher-level device 2 with respect to the address "1" because the communication device 3b1 does not recognize the call signal Sg1 as a call to itself. In this respect, the situation is handled in the same manner as depicted in FIG. 2, which illustrates the conventional processing.

However, even in a state where the reconnection is made, the present invention is configured to exercise an address duplication monitoring function by confirming the address of the communication frame of the response signal Sg2 issued by the other communication terminal devices 3 and checking whether the confirmed address is a duplicate of the address set for the local communication terminal device.

In the above-described state, the higher-level device 2 transmits the call signal Sg1 designating the communication device 3c1, and thus causes the communication device 3c1 to return the response signal Sg2 at time t2 in reaction to the call signal Sg1. At time t2, the communication device 3b1 detects a duplication of the local address because the address is erroneously set to "2" although it should be set to "1." Further, at subsequent stages including the normal communication stage ST3c, which is a later stage subsequent to the detection of duplication, the communication device 3b1 locks its operation. This is an opening locked state.

As a result, even if the operating personnel M1 issues an instruction for performing the opening procedure to the address "2" without noticing the address setting error at the opening processing stage ST3b, which is an intermediate stage of the hotline maintenance/replacement state ST3, the communication device 3b1 in the locked state does not return a response signal.

Consequently, the communication device 3b1 locked in the normal communication stage ST3c, which is a later stage, does not react to a call to the address "2," and detects the locked state by detecting an address duplication through monitoring the responses returned from the other communication device 3c1. Meanwhile, as a consequence of the above, the higher-level device 2 is able to detect that the communication device 3b1 is not responding.

Figure 4:
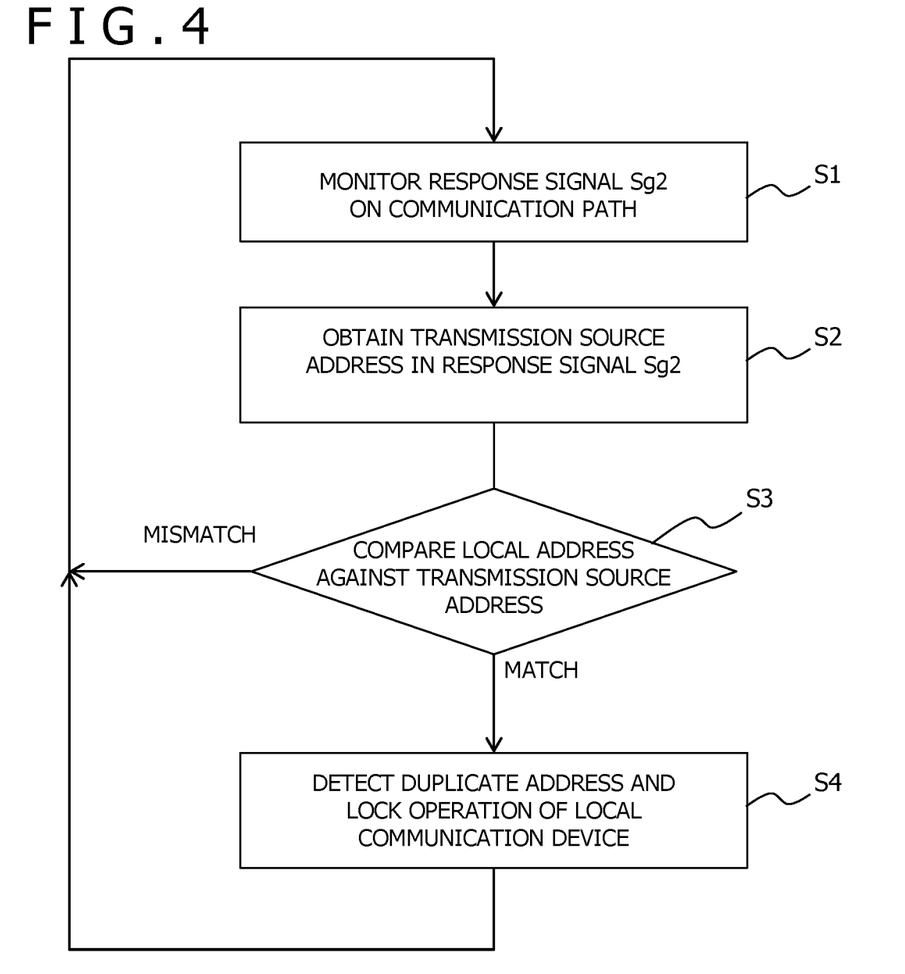
FIG. 4 is a flowchart illustrating a process performed by individual communication devices included in communication terminal devices.

FIG. 4 is a flowchart illustrating a process performed by the individual communication devices 3a1, 3b1, and 3c1 included in the communication terminal devices 3 (3a, 3b, and 3c). Referring to FIG. 4, in processing step S1, the communication devices 3a1, 3b1, and 3c1 each monitor the response signal Sg2 on the communication path 4, and in processing step S2, the communication devices 3a1, 3b1, and 3c1 each extract a transmission source address from a frame in the response signal Sg2. In the above instance, the transmission source address in the response signal Sg2 represents the other communication devices 3a1, 3b1, and 3c1 included in the communication terminal devices 3 (3a, 3b, and 3c), and a transmission destination address represents the higher-level device 2.

In processing step S3, the communication devices 3a1, 3b1, and 3c1 each compare the extracted transmission source address against the local address. If the comparison indicates a mismatch, the communication devices 3a1, 3b1, and 3c1 return to processing step S1 and repeatedly execute the same processing. Meanwhile, if the comparison indicates a match, the communication devices 3a1, 3b1, and 3c1 detect the occurrence of a duplicate address in processing step S3, and then lock the operation of the local communication device. The local communication device placed in the locked state is inhibited from reacting to a call that is issued from the higher-level device 2 to the local communication device. Therefore, the local communication device is assumed to be nonexistent on the communication path, so that communication continues to be normally conducted between the other communication devices and the higher-level device 2.

After the locked state is recognized in processing step S4, processing may alternatively return to processing step S1, repeatedly execute the same processing, and reconfirm the locked state. An alternative is to continue in the locked state once it is recognized. The locked state should be released when, for example, the locked communication device is disconnected from the communication path or turned off.

Second Embodiment

Figure 5:
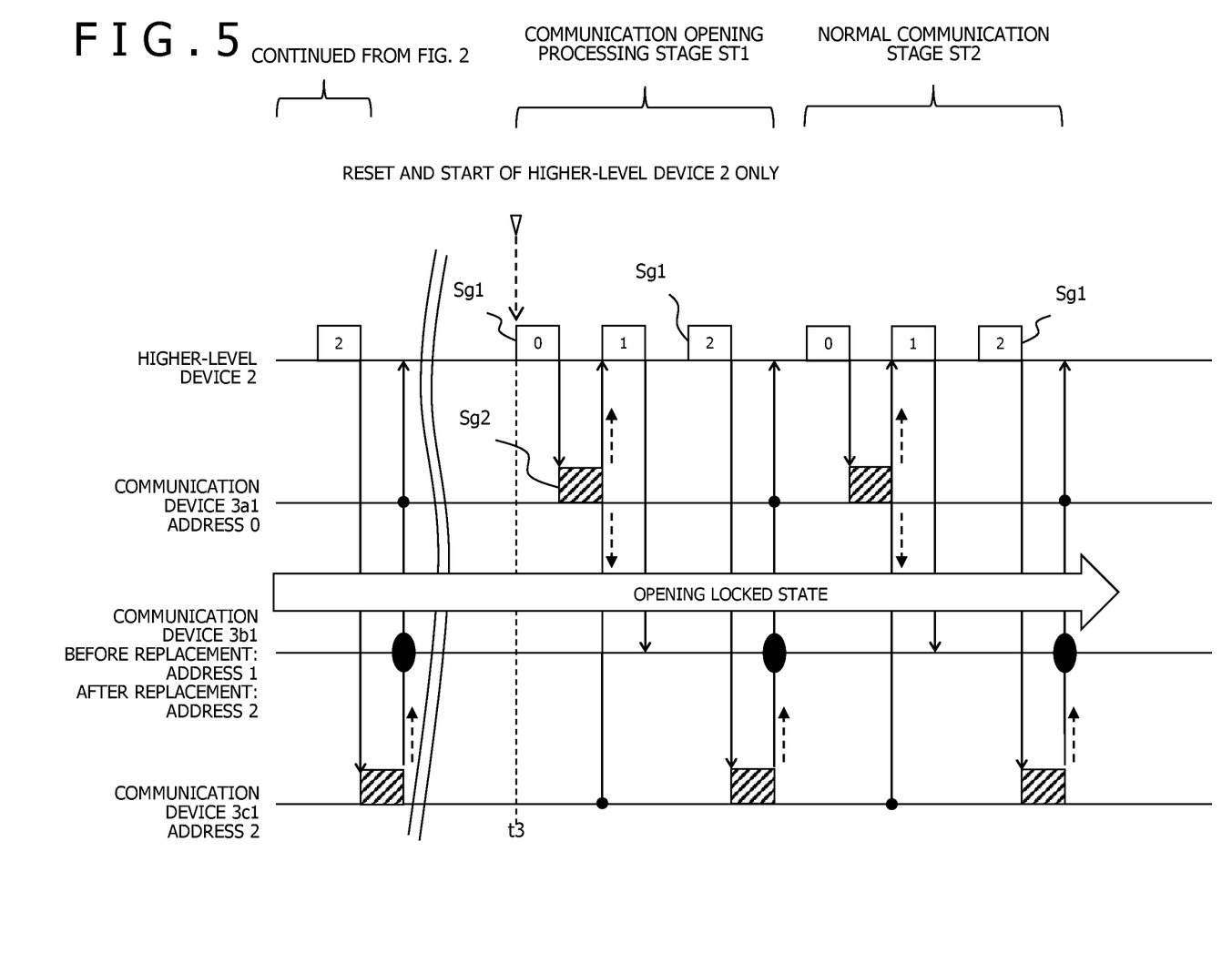
FIG. 5 is a diagram illustrating an example of processing performed subsequently to the communication states depicted in FIG. 3.

A second embodiment will now be described with reference to FIG. 5 by using an example of processing performed subsequently to the processing depicted in FIG. 3. At the normal communication stage ST3c, which is the last stage depicted in FIG. 3, the communication device 3b1 having an erroneously set address detects a duplication of the transmission source address of the response signal Sg2 returned by the communication device 3c1 having the same address as the communication device 3b1, and then places the communication device 3b1 itself in the locked state. The resulting state is a state where no response is returned from the communication device 3b1 as viewed from the higher-level device 2. Therefore, for example, the higher-level device 2 is suspected of being faulty, and then reset and restarted. The time of such restart is indicated as time t3 in FIG. 5.

The higher-level device 2 performs the communication opening procedure, as is the case with normal startup. The communication opening procedure is performed to issue a communication opening request frame Sg1 from the higher-level device 2 to the communication devices 3. Then, first of all, the communication device 3a1 returns the response signal Sg2 including a response frame indicative of the completion of communication opening. The communication opening procedure is sequentially performed in the same manner with respect to the communication devices 3b1 and 3c1.

At this time point, the communication device 3b1 is in the opening locked state. Therefore, the communication device 3b1 does not receive, from the higher-level device 2, the call signal Sg1 including the communication opening request frame. Consequently, as the communication device 3b1 does not malfunction, the communication between the higher-level device and the other communication terminal devices can be continuously executed without delay.

Third Embodiment

A third embodiment will now be described with reference to the flow of processing that is performed to identify the communication device 3b1 having an erroneously set address and achieve recovery by restoring the communication device 3b1 to the communication path. It should be noted that FIG. 5 depicts how to deal with a situation where a degenerate operation of the plant is to be performed by using the communication between normal devices, and that FIG. 6 depicts the flow of processing performed to identify an abnormality and achieve recovery.

Figure 6:
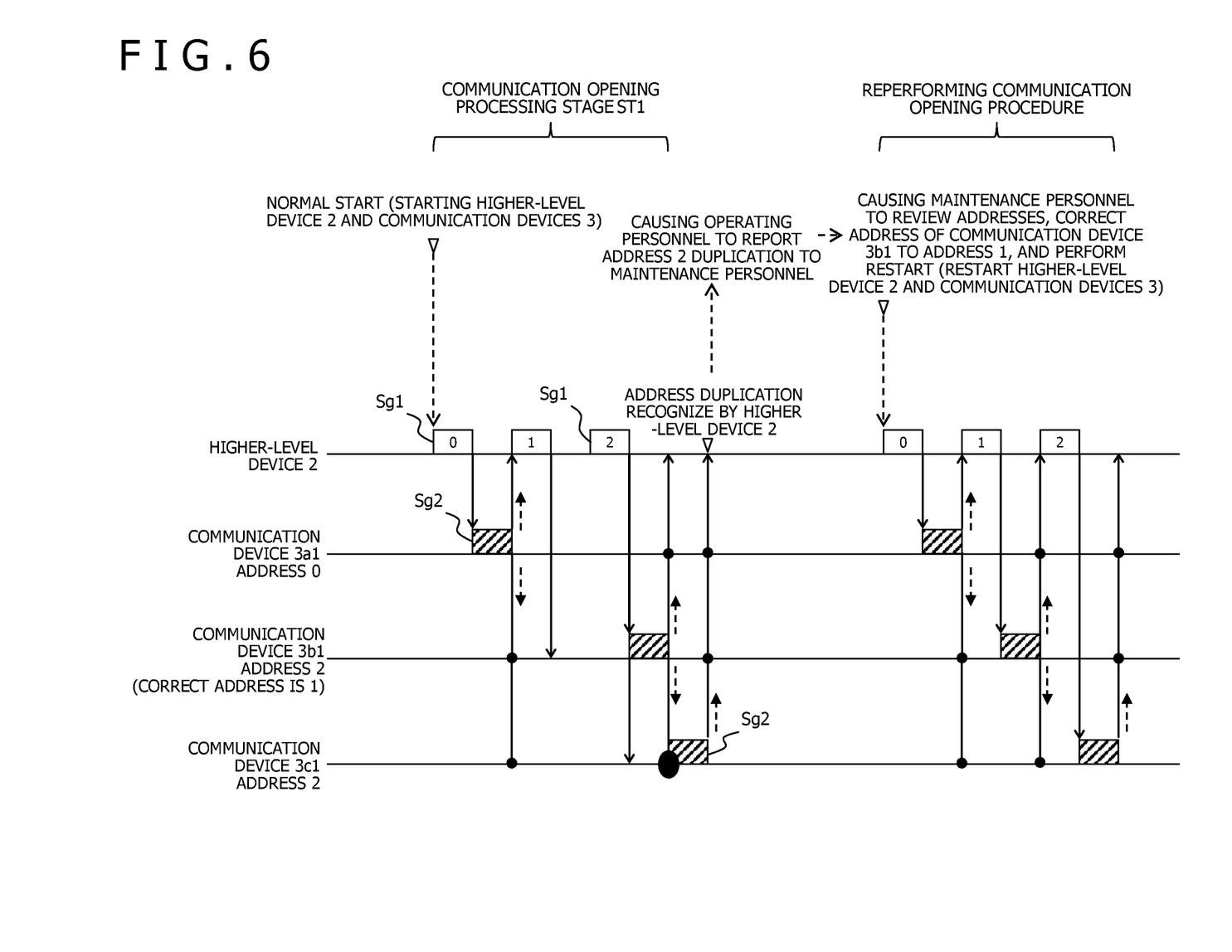
FIG. 6 is a diagram illustrating the flow of processing performed to identify an abnormality and achieve recovery.

In a recovery scene depicted in FIG. 6, the higher-level device 2 and the communication devices 3a1, 3b1, and 3c1 are once totally stopped (e.g., turned off) and then started anew. Therefore, it is assumed that the communication device 3b1 placed in the locked state is unlocked by such a power turn-off.

In the above case, the higher-level device 2 sequentially performs the communication opening procedure ST1 with respect to the communication devices 3a1, 3b1, and 3c1. The higher-level device 2 issues the call signal Sg1 including a request frame for communication opening to the communication device 3a1, and then the communication device 3a1 returns the response signal Sg2 including a response frame indicative of the completion of communication opening. Subsequently, similarly, the higher-level device 2 sequentially performs the communication opening procedure with respect to the communication devices 3b1 and 3c1. However, the communication device 3b1 returns no response because the address "2" is set for the communication device 3b1 although the call signal Sg1 is for the address "1."

Meanwhile, in a case where the higher-level device 2 issues the call signal Sg1 including the request frame having the address "2" in order to communicate with the communication device 3c1, the communication devices 3b1 and 3c1 have the same address, so that both of these communication devices 3b1 and 3c1 open the communication in response to the call signal Sg1 including the communication opening request frame for the address "2," and return the response signal Sg2 including the response frame.

If, in the above scene, the response signal Sg2 including the response frame of the communication device 3c1 is delayed from the response signal Sg2 including the response frame of the communication device 3b1, no communication conflict occurs. Therefore, the higher-level device 2 cannot detect the abnormality. However, after communication opening, the communication device 3c1 monitors and checks the communication frame of the communication device 3b1, detects an address duplication, and thus sends a report to the higher-level device 2 with information indicative of the address duplication attached to the response signal Sg2 from the communication device 3c1. Therefore, the higher-level device 2 is able to recognize the address duplication.

In response to the above result, the operating personnel M1 notifies the maintenance personnel M2 of the address duplication of the address "2," then corrects the address of the communication device 3b1 to "1," and performs a restart (restarts the higher-level device 2 and the communication devices 3). Consequently, the higher-level device 2 is able to start normal communication in a state where the address duplication is cleared.

What is claimed is:

1. A communication device for a plant control system, comprising:
   a higher-level device including a central processing unit; and
   a plurality of communication terminal devices, each including a communication device and a process input/output device, the plurality of communication terminal devices being connected to each other through a communication path,
   wherein prior to start of communication, the higher-level device executes a communication opening process of sequentially transmitting a first call signal to the communication terminal devices and acknowledging response signals from the communication terminal devices, and proceeds to execute a normal communication process of sequentially transmitting a second call signal to the communication terminal devices and receiving response signals from the communication terminal devices,
   wherein the communication terminal devices compare addresses of the response signals returned from other communication terminal devices to the higher-level device against an address set for a local communication terminal device, and if the comparison indicates that a duplicate address exists, lock communication from the local communication terminal device,
   wherein when one of the communication terminal devices is locked, unlock the locked communication terminal device by restarting the higher-level device and the communication terminal devices, and
   wherein the higher-level device executes the communication opening process after the restart, and the communication terminal device detected to have a duplicate address during the communication opening process issues a response signal thereof to notify the higher-level device of address duplication and prompts for an address review to achieve recovery.

2. The communication device according to claim 1, wherein when hotline insertion/removal is performed on the communication device to reconnect the communication device to the communication path, the communication terminal devices execute the communication opening process, and proceed to execute the normal communication process.

3. A communication method for a plant control system configured such that a higher-level device and a plurality of communication terminal devices are connected to each other through a communication path, wherein the communication terminal devices each include a communication device and a process input/output device, the communication method comprising the steps of:

causing the plant control system to execute, prior to start of communication, a communication opening process of sequentially transmitting a first call signal from the higher-level device to the communication terminal devices and acknowledging response signals from the communication terminal devices, and proceed to execute a normal communication process of sequentially transmitting a second call signal from the higher-level device to the communication terminal devices and receiving response signals from the communication terminal devices;

causing the communication terminal devices to compare addresses of the response signals returned from other communication terminal devices to the higher-level device against an address set for a local communication terminal device, and if the comparison indicates that a duplicate address exists, causing the communication terminal devices to lock communication from the local communication terminal device;

when one of the communication terminal devices is locked, unlocking the locked communication terminal device by restarting the higher-level device and the communication terminal devices; and executing the communication opening process after the restart, causing the communication terminal device detected to have a duplicate address during the communication opening process to issue a response signal thereof to notify the higher-level device of address duplication and prompt for an address review to achieve recovery.

4. The communication method according to claim 3, the communication method comprising the steps of:

when hotline insertion/removal is performed on the communication device to reconnect the communication device to the communication path, causing the communication terminal devices to execute the communication opening process, and proceed to execute the normal communication process.

5. The communication method according to claim 4, comprising the steps of:

when one of the communication terminal devices is locked, unlocking the locked communication terminal device by restarting the higher-level device and the communication terminal devices; and executing the communication opening process after the restart, causing the communication terminal device detected to have a duplicate address during the communication opening process to issue a response signal thereof to notify the higher-level device of address duplication and prompt for an address review to achieve recovery.

* * * * *